United States Patent
Roesser

(10) Patent No.: US 8,346,478 B2
(45) Date of Patent: Jan. 1, 2013

(54) LOCATION AND MOBILE-ADAPTATION OF WIRELESS ACCESS-POINTS USING MAP-BASED NAVIGATION

(75) Inventor: Robert P. Roesser, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 12/731,858

(22) Filed: Mar. 25, 2010

(65) Prior Publication Data

US 2011/0238286 A1  Sep. 29, 2011

(51) Int. Cl.
*G01C 1/00* (2006.01)

(52) U.S. Cl. ........ 701/454; 701/460; 701/461; 701/467; 701/468; 701/503; 340/988; 340/990; 340/995.1; 340/995.18; 340/995.24; 296/37.7; 296/37.8; 342/458; 342/357.31; 342/357.34; 224/275; 224/277; 224/311; 348/134; 348/158

(58) Field of Classification Search .............. 701/1, 454, 701/460, 461, 467, 468, 503, 532; 340/988, 340/990, 995.1, 995.18, 995.24; 296/37.7, 296/37.8, 490; 342/357.31, 357.34, 458; 224/275, 277, 311; 455/557; 348/143, 158
See application file for complete search history.

(56) References Cited

U.S. PATENT DOCUMENTS

| | | | | |
|---|---|---|---|---|
| 6,128,482 | A * | 10/2000 | Nixon et al. | 455/414.1 |
| 6,748,211 | B1 * | 6/2004 | Isaac et al. | 455/414.1 |
| 7,124,023 | B2 | 10/2006 | Peeters | |
| 7,299,013 | B2 * | 11/2007 | Rotta et al. | 455/67.16 |
| 7,609,174 | B2 * | 10/2009 | Tengler et al. | 340/905 |
| 7,720,581 | B2 * | 5/2010 | Yaqub | 701/33 |
| 7,894,861 | B2 * | 2/2011 | Grivas et al. | 455/569.2 |
| 2004/0068350 | A1 * | 4/2004 | Tomson | 701/1 |
| 2004/0106379 | A1 * | 6/2004 | Zen et al. | 455/67.11 |
| 2004/0199303 | A1 | 10/2004 | Ohmura et al. | |
| 2004/0203890 | A1 | 10/2004 | Karaoguz et al. | |
| 2004/0205153 | A1 * | 10/2004 | Weisshaar et al. | 709/217 |
| 2005/0049021 | A1 * | 3/2005 | Nedelcu et al. | 455/575.9 |
| 2005/0083211 | A1 * | 4/2005 | Shafir et al. | 340/905 |
| 2005/0273255 | A1 | 12/2005 | Watkins et al. | |
| 2006/0095199 | A1 | 5/2006 | Lagassey | |
| 2006/0283952 | A1 * | 12/2006 | Wang | 235/462.01 |
| 2007/0032943 | A1 * | 2/2007 | Okabe | 701/200 |
| 2007/0168104 | A1 * | 7/2007 | Nelson et al. | 701/93 |

(Continued)

FOREIGN PATENT DOCUMENTS

JP  2003217088  7/2003

(Continued)

*Primary Examiner* — Mary Cheung
*Assistant Examiner* — Marc McDieunel
(74) *Attorney, Agent, or Firm* — John A. Miller; Miller IP Group, PLC

(57) ABSTRACT

A system and method for populating a map database for a vehicle navigation system with the location and type of wireless access points that can be used to update or service wireless systems on the vehicle. The map database can be initially populated with the known wireless access points at the time of manufacture of the vehicle, and then the vehicle communications system can detect new wireless access points as the vehicle travels, which can be stored on the map database. By storing the location and type of the access points in the map database, the vehicle will know the direction of the access point relative to the vehicle, and can compensate for the Doppler shift as a result of the relative movement of the vehicle to the access point.

18 Claims, 1 Drawing Sheet

U.S. PATENT DOCUMENTS

| | | | |
|---|---|---|---|
| 2007/0197231 A1* | 8/2007 | Lin | 455/456.1 |
| 2008/0095163 A1* | 4/2008 | Chen et al. | 370/392 |
| 2009/0239549 A1* | 9/2009 | Grigsby et al. | 455/456.1 |
| 2010/0070107 A1* | 3/2010 | Berkobin et al. | 701/1 |
| 2010/0070174 A1* | 3/2010 | Michalek et al. | 701/210 |
| 2010/0114481 A1* | 5/2010 | Roesser | 701/208 |

FOREIGN PATENT DOCUMENTS

| | | |
|---|---|---|
| JP | 2004340864 | 12/2004 |
| KR | 2006029302 | 4/2006 |

* cited by examiner

LOCATION AND MOBILE-ADAPTATION OF WIRELESS ACCESS-POINTS USING MAP-BASED NAVIGATION

BACKGROUND OF THE INVENTION

1. Field of the Invention

This invention relates generally to a system and method for populating a map database associated with a navigation system with the locations and characteristics of wireless access points and, more particularly, to a system and method for populating a map database associated with a vehicle navigation system with wireless access points by pre-installing the location and type of the access points in the database and/or identifying the location and type of the access points as the vehicle travels and then storing the locations in the map database.

2. Discussion of the Related Art

A wide variety of vehicle systems currently being manufactured and anticipated to be manufactured in future vehicles require external communications using wireless protocols. For example, these vehicles may include map databases for navigation systems, weather information systems, traffic information systems, entertainment systems, etc. These systems may require continuous, or near continuous, updating so that the information used by the system is current in order to be effective. The updating techniques for these systems need to be inexpensive and cost effective. Typically, the updating techniques now being used for these types of systems are discretionary and require communications that are not necessarily highly reliable.

It is well known that the motion of an in-vehicle transceiver has various adverse effects on communications, as a result of Doppler shift, multi-path effects and channel variations. Much development effort has been expended in mitigating these effects, including the use of pilot signals, modulation schemes and channel characterization, which have led to success for cellular phones, but less success for wireless local-area networks.

SUMMARY OF THE INVENTION

In accordance with the teachings of the present invention, a system and method are disclosed for populating a map database for a vehicle navigation system with the location and type of wireless access points that can be used to update or service wireless systems on the vehicle. The map database can be initially populated with the known wireless access points at the time of manufacture of the vehicle, and then the vehicle communications system can detect new wireless access points as the vehicle travels, which can be stored in the map database. By storing the location and type of the access points in the map database, the vehicle will know the direction of a nearby access point relative to the vehicle, and can compensate for the Doppler shift as a result of the relative movement of the vehicle to the access point.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for populating a map database for a navigation system with the location and type of wireless access points is merely exemplary in nature, and is in no way intended to limit the invention or its applications or uses. For example, the present invention has particular application for populating the map database for a vehicle navigation system with wireless access points. However, as will be appreciated by those skilled in the art, the system and method of the invention may have application for populating other map databases for non-vehicular navigation systems.

Figure 1:
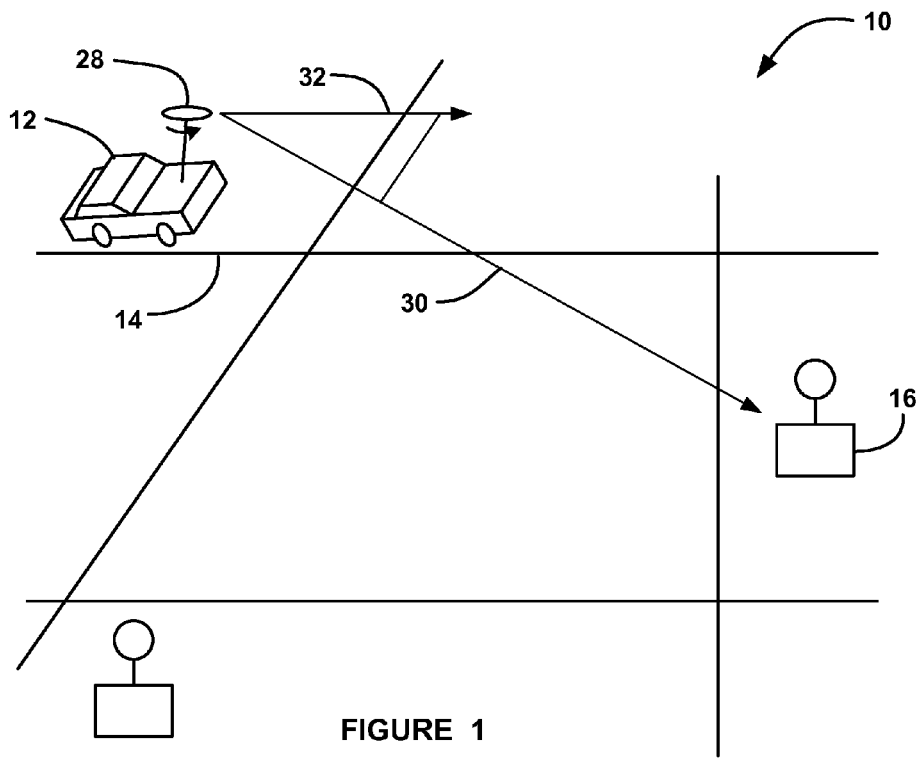
FIG. 1 is a plan view of a vehicle traveling on a roadway relative to wireless access points.

FIG. 1 is a plan view of a communications situation 10 used involving a vehicle 12 traveling along a roadway 14. The vehicle 12 includes several wireless systems, discussed in more detail below, that are capable of receiving and transmitting wireless signals to and from wireless access points 16 provided at various locations along the roadway 14. A steerable antenna 28 on the vehicle 12 allows the vehicle 12 to transmit and receive signals consistent with the discussion herein. The wireless access points 16 are provided to represent any wireless communications access system intended for public-use that allows the wireless systems in the vehicle 12 to access the internet. Such public wireless access points 16 are becoming more prevalent, where various business and municipalities provide such access points for public use. As will be discussed in detail below, the location and type of the wireless access points 16 relative to the roadway 14 are stored on the vehicle 12 so that the vehicle 12 can provide scheduling, updating and other services for the various wireless systems on the vehicle 12.

Figure 2:
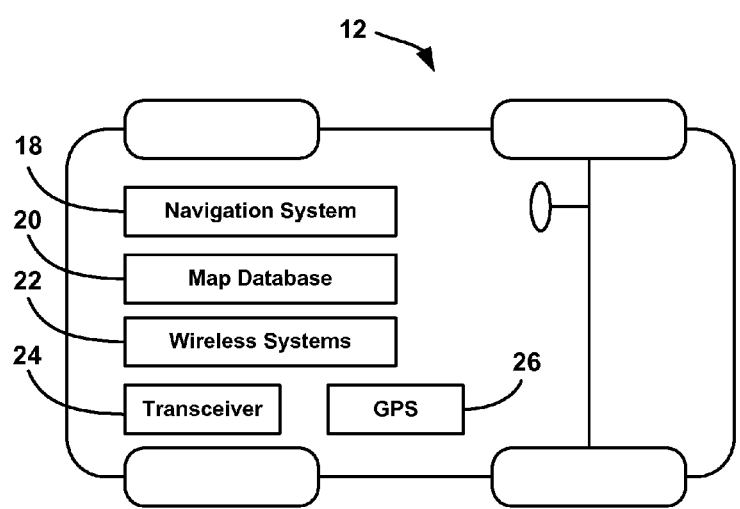
FIG. 2 is a simplified plan view of the vehicle shown in FIG. 1 including various wireless communication systems, such as a navigation system, a map database, an entertainment system, a GPS receiver, etc.

FIG. 2 is a plan view of the vehicle 12 showing various systems thereon including a navigation system 18, a map database 20 associated with the navigation system 18, and other wireless systems 20, such as an entertainment system, traffic information system, weather information system, etc. The map database 20 is a database of the roadways that the vehicle 12 may be traveling on and the location of various facilities relative to those roadways. Known map databases for vehicle navigation systems and otherwise typically store the location of various businesses and other facilities that a vehicle driver may be interested in, such as restaurants, gas stations, post offices, hotels, church's, grocery stores, etc.

The vehicle 12 also includes a transceiver 24 for sending and receiving the wireless signals and a GPS receiver 26 for estimating the location of the vehicle 12. The navigation system 18 uses outputs from the GPS receiver 26, along a dead-reckoning and map-matching, to estimate the relative location of the vehicle 12 with respect to the roadway 14 in a manner that is well understood to those in the art.

The public access points 16 serve as a potential basis for providing low or no cost internet connectivity to vehicles so that the various wireless systems in the vehicle 12 can be updated using the wireless access points 16 as the vehicle 12 travels relative thereto. However, a number of issues arise as a result of using the wireless access points 16, including the need to know the location and type of the access points 16 so that their use can be planned for a specific service and the need to mitigate motion-induced communication degradation due to Doppler shift, channel variation and multi-path effects of signals transmitted and received by the transceiver 24. For the type of access point, the access point 16 may need to have a minimum bandwidth and also may have to be compliant with predetermined security requirements.

According to the present invention, a system and method are provided that allow the map database 20 to be populated with the location and type of the wireless access point 16. The map database 22 may be initially populated with the location and type of the wireless access points 16 when the vehicle 12 is manufactured, and as the vehicle 12 travels on the roadway 14, the location of the wireless access points 16 that were not originally provided in the initial system can be identified and stored in the map database 22. Further, wireless access points 16 can be deleted from the map database if the vehicle 12 travels near a location where an access point has been stored in the map database, and no access point is detected. Because the access points 16 may be temporarily disabled at any given time, it probably will be necessary to determine that the access point is not operating a number of times before the system will delete the access point from the map database 20.

The wireless access point information is made available for the navigation system 18 to schedule communications sessions for specific needs, such as downloading traffic information or uploading e-mail messages. The information is also used to compute adjustments to the transceiver 24 to accommodate motion-induced communication effects. As the vehicle 12 approaches an access point 16, it may send out a request for a specific update for one or more of the wireless systems 22 on the vehicle 12 so that as the vehicle 12 is passing the proximity of the access point 16 it can download those updates so that the system stays current. Further, the vehicle operator may want to access the internet for some purpose using a personal device that the operator may have in the vehicle, such as a laptop computer. At the users request, or otherwise, the display associated with the navigation system can display the access points 16 on the map so that the vehicle operation will know where to go to use those access points 16.

The vehicle operation may use the navigation system 18 to plan a route for a certain trip. The route may be specifically planned to enhance the availability of the wireless access points 16 to use those access points 16 when needed. Along the vehicle route, all wireless access points with suitable characteristics, such as air interface, bandwidth, route proximity, cost, etc., are noted. The communications between the vehicle 12 and the wireless access points 16 and the timing for all information services are assessed and matched to the specific access point.

Further, by knowing the location of an access point 16, three major effects of vehicle motion can be mitigated. First, the speed of the vehicle 12 relative to the access point 16 is computed by projecting a relative velocity vector 30 for the vehicle 12, as determined by the navigation system 18, along a line connecting the location of the access point 16 to the vehicle 12. The effect of the Doppler shift is to change all carrier frequencies, both sent and received, in a way predicted by the relative vehicle speed. This effect is mitigated by tuning the in-vehicle transceiver 24 to offset all involved frequencies by a compensation amount. Channel variations due to motion include phase-shift and amplitude attenuation. These are mitigated using both simple mathematical equations and channel parameters tabulated in the map database 20. Multi-path effects are mitigated by using a directional electromagnetic field model or the vehicle 12 and factoring in the orientation of the vehicle 12 relative to the access points 16.

In order to overcome the effects of the Doppler shift, the transceiver 24 receives a vehicle speed signal either from the GPS receiver 26, a vehicle speed sensor (not shown) on the vehicle 12, or some other suitable technique that identifies the speed of the vehicle 12. The transceiver 24 also knows the direction of the vehicle 12 from the navigation system 18, or otherwise, and thus, can calculate a forward vector 32. The transceiver 24 also knows the direction of an access point 16 from the map database 20 and the GPS information, and thus, can calculate the velocity vector 30 using the vehicle speed, the vehicle direction and the direction of the access point 16. From this information, the transceiver 24 can calculate the velocity of the vehicle 12 relative to the access point 16 by the triangle formed from the vectors 32 and 30. Thus, the transceiver 24 can compensate for the motion of the vehicle 12 relative to the access point 16, and thus, cancel the Doppler shift. Therefore, the transceiver 24 can remain tuned to the signals from the access point 16 as it moves.

Further, because the antenna 28 is steerable it can be directed towards the access point 16 because the transceiver 24 knows the exact direction of the access point 16 from the map database 20 and GPS information. By directing the antenna 28 towards the access point 16, a focusing effect can be provided where other signals that are not from the direction of the access point 16 will not significantly affect or be received by the antenna 28. These other effects may include other noise and multi-path effects as a result of reflections of the signal off of various structures, such as buildings, in the particular environment that the vehicle 12 is traveling. Any suitable technique for steering the antenna 28 can be employed whether it is a mechanical steering mechanism or an electronic steering mechanism, such as digital beamforming. By providing a narrow angle for the antenna 28, other interfering noise can be eliminated.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing wireless services for a vehicle, said method comprising:
   providing a map database on the vehicle; and
   populating by a processor the map database with the location and type of a plurality of wireless access points existing along a roadway where the wireless access points provide wireless communications to the vehicle wherein populating the map database includes initially storing the location of the wireless access points in the map database where the vehicle is manufactured.

2. The method according to claim 1 wherein the wireless access points are public-use wireless access points.

3. The method according to claim 1 wherein populating the map database includes detecting wireless access points as the vehicle travels along the roadway and storing the location and type of the wireless access points in the map database when they are detected.

4. The method according to claim 1 wherein the wireless services include updating a vehicle entertainment system.

5. The method according to claim 1 wherein the wireless services include updating the map database.

6. The method according to claim 1 further comprising correcting a Doppler shift caused by the motion of the vehicle relative to an access point by determining a forward vector based on the speed and direction of the vehicle and an access point vector based on the speed and direction of the vehicle relative to the access point and using the forward vector and the access point vector to determine the relative speed of the vehicle to the access point.

7. The method according to claim 1 further comprising providing a steerable antenna on the vehicle that can be turned in the direction of a wireless access point.

8. The method according to claim 1 further comprising mitigating channel variations as a result of phase-shift and amplitude attenuation using a direction of the access points.

9. The method according to claim 1 further comprising mitigating multi-path effects using a directional electromagnetic field model of the vehicle and factoring in the orientation of the vehicle relative to the access points.

10. A method for providing wireless services for a vehicle, said method comprising:

providing a map database on the vehicle associated with a vehicle navigation system;

populating by a processor the map database with the location and type of a plurality of public-use wireless access points existing along a roadway on which the vehicle may travel where the wireless access points provide wireless communications to the vehicle, where populating the map database includes initially storing the location of the wireless access points in the map database when the vehicle is manufactured and detecting wireless access points as the vehicle travels along the roadway and storing the location of the wireless access points in the database when they are detected; and correcting a Doppler shift caused by the motion of the vehicle relative to an access point.

11. The method according to claim 10 wherein the wireless services include updating the map database.

12. The method according to claim 10 wherein correcting the Doppler shift includes determining a forward vector based on speed and direction of the vehicle and an access point vector based on the speed and direction of the vehicle relative to the access point and using the forward vector and the access point vector to determine the relative speed of the vehicle to the access point.

13. The method according to claim 10 further comprising providing a steerable antenna on the vehicle that can be turned in the direction of a wireless access point.

14. The method according to claim 10 further comprising mitigating channel variations as a result of phase-shift and amplitude attenuation using a direction of the access points.

15. The method according to claim 10 further comprising mitigating multi-path effects using a directional electromagnetic field model of the vehicle and factoring in the orientation of the vehicle relative to the access points.

16. A system for providing wireless services for a vehicle, said system comprising:

a map database on the vehicle; and means for populating the map database with a plurality of public use wireless access points existing along a roadway where the wireless access points provide wireless communications to the vehicle, said means for populating the map database includes detecting the access points as the vehicle travels, wherein the means for populating the map database also populates the map database with the wireless access points at the time of vehicle manufacture.

17. The system according to claim 16 further comprising means for correcting a Doppler shift caused by the motion of the vehicle relative to an access point by determining a forward vector based on the speed and direction of the vehicle and an access point vector based on the speed and direction of the vehicle relative to the access point and using the forward vector and the access point vector to determine the relative speed of the vehicle to the access point.

18. The system according to claim 16 further comprising means for mitigating channel variations as a result of phase-shift and amplitude attenuation using a direction of the access points and means for mitigating multi-path effects using a directional electromagnetic field model of the vehicle and factoring in the orientation of the vehicle relative to the access points.

* * * * *